W. S. FRANKLIN.
SWIMMING POOL.
APPLICATION FILED JAN. 28, 1914.
1,125,301.
Patented Jan. 19, 1915.
2 SHEETS—SHEET 1.
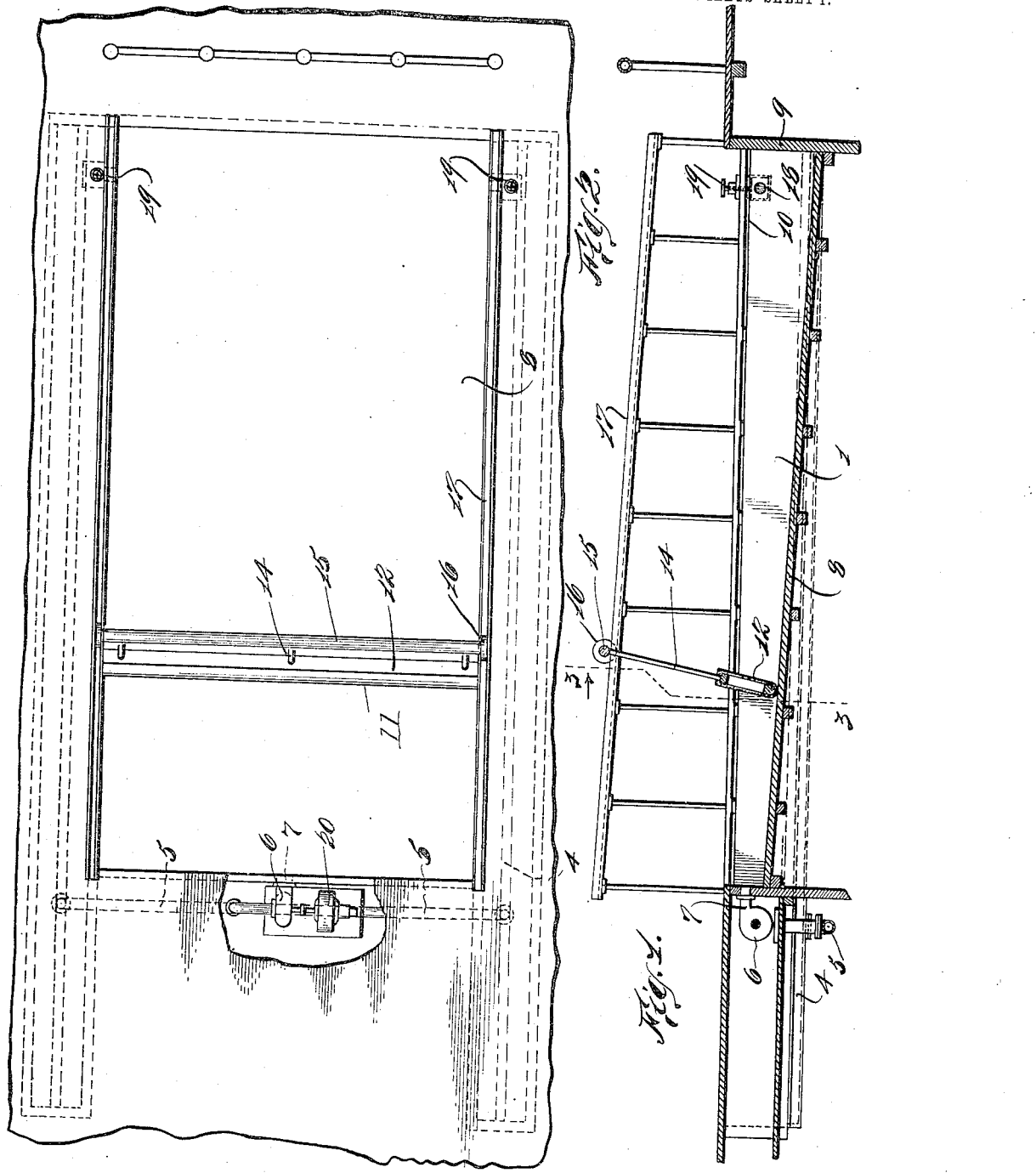

W. S. FRANKLIN.
SWIMMING POOL.
APPLICATION FILED JAN. 28, 1914.
1,125,301.
Patented Jan. 19, 1915.
2 SHEETS—SHEET 2.
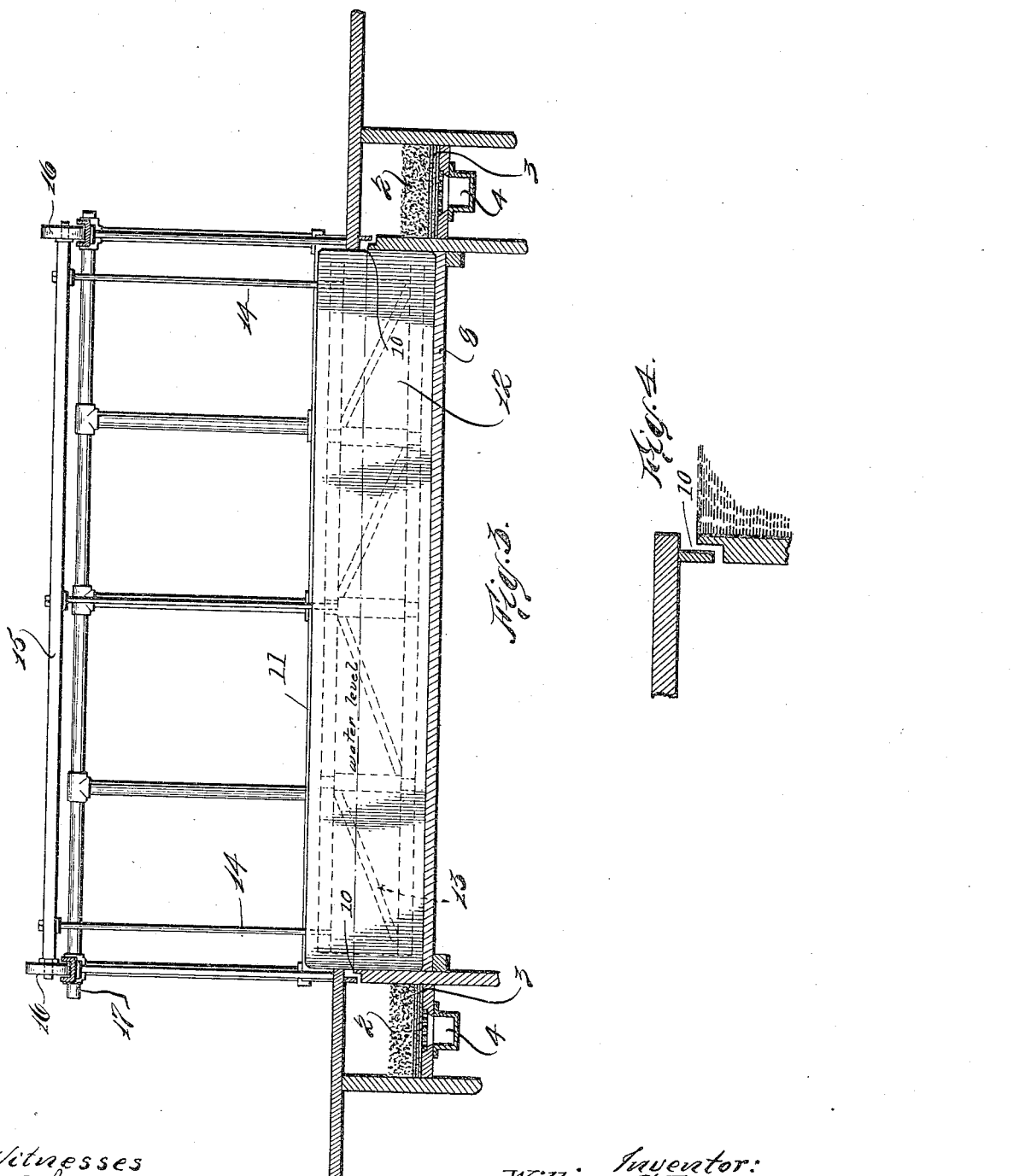

UNITED STATES PATENT OFFICE.

WILLIAM S. FRANKLIN, OF SOUTH BETHLEHEM, PENNSYLVANIA.

SWIMMING-POOL.

1,125,301. Specification of Letters Patent. Patented Jan. 19, 1915.

Application filed January 28, 1914. Serial No. 814,870.

*To all whom it may concern:*

Be it known that I, WILLIAM S. FRANKLIN, a citizen of the United States, residing at South Bethlehem, Pennsylvania, have invented certain new and useful Improvements in Swimming-Pools, of which the following is a clear, full, and exact description.

This invention relates to swimming pools or other reservoirs.

A principal object of the invention is to provide means for purifying the water of a swimming pool without necessitating the use of a large quantity of water and substantially without waste of water.

A further object of the invention is to provide for maintaining the purity of the water in the reservoir or pool such as a swimming pool without interfering with the continuous use of the reservoir or pool.

A further object of the invention is to substantially prevent the mixture of the purified water with the contaminated or impure water which has been used.

The general object of the invention is to provide a simple and effective purifying plant for a reservoir.

The invention consists in the combination of parts and simplicity of details hereinafter described, all of which contribute to produce an efficiently purified pool or reservoir.

A preferred embodiment of my invention will be particularly described in the following specification, while the broad scope of my invention will be pointed out in the appended claims.

In the drawings, Figure 1 is a longitudinal section through the apparatus embodying my invention; Fig. 2 is a plan partly broken away; Fig. 3 is a vertical cross-section taken about on the line 3—3 of Fig. 1; and Fig. 4 is a section through the spillway at the side of the pool.

Before proceeding to a detailed description of the invention, it should be stated that where the invention is applied to a swimming pool, the general object is to maintain the water at a high state of purity. This is desirable for the reason that swimmers frequently take quantities of water into their mouths and as it is decidedly distasteful and insanitary for them to swallow this water, they frequently expectorate into the pool. I provide an arrangement whereby an open spill-way is formed around the pool into which the bathers may expectorate if they choose, but I also provide means for maintaining the water at a high state of purity so that it is practically drinkable water.

The apparatus embodying my invention preferably comprises a pool or reservoir 1 associated with which I provide the water-purifying or filtration plant preferably consisting of filter-beds 2 which may be arranged on opposite sides of the reservoir. These beds may be of sand or any suitable material preferably laid upon filter-plates 3 which may be of charcoal or any other porous filtering substance, and below these plates 3 intakes 4 are formed which lead the water to a cross-pipe 5 connecting with the circulating pump 6 having a delivery outlet 7 preferably near one end of the reservoir or pool. Also the bottom 8 of the reservoir is preferably inclined so that it is most elevated near the pipe 7 where the filtered water enters. Along the walls 9 of the pool I provide a lip or spill-way 10 which determines the high water level in the pool. The water is constantly pouring over this spill-way and finds its way from there back into the filtering beds. I prefer to prevent a mixture of the filtered water with the unfiltered water. For this reason, I prefer to provide a transverse dam or sweep 11, which forms a movable bulk-head or dividing wall across the pool. The lower edge and side edges of this sweep are provided with a packing substance such as burlap, indicated at 12 in Fig. 1. The body of this sweep may be made of any suitable water-tight material attached to a suitable framework 13. This sweep is preferably suspended by rods 14 from a transverse shaft or cross-head 15, and the ends of this cross-head 15 are preferably provided with rollers or wheels 16 which run in an inclined support which may be formed of tracks 17 of inverted channel iron. This support 17 inclines downwardly toward the deep end of the pool which may be the end remote from the inlet pipe 7, and when the sweep is in position, it preferably inclines slightly as indicated in Fig. 1.

Preferably near the deep end of the pool I provide an outlet 18 which when opened, slightly reduces the water level in the pool on that side of the sweep so that the level drops slightly below the normal level which is the height of the spillway 10. The gate 19 of this outlet is opened only when the water is to be filtered. However, in practice it is preferable to filter and change the water constantly for which reason I prefer to drive the pump 6 by a suitable motor 20.

The mode of operation of the apparatus is substantially as follows:—The sweep 11 is placed at one end of the pool, preferably at the shallow end. The water which accumulates in the filter-beds is drawn off by the circulating pump 6 and forced into the pool between the sweep and the adjacent transverse wall of the pool. By slightly opening the gate 19, a slight reduction in head of the water in the other part of the pool results, and consequently a slight effective pressure is developed on the side of the sweep near the wall. This pressure tends to push the sweep toward the other end of the pool and this action is made automatic through the operation of the inclined track 17 down which the cross-head 15 rolls slowly as the sweep advances. The sweep substantially cuts off communication between the two parts of the pool so that I substantially prevent a mixture of the filtered water with the unfiltered water. Also as the sweep is padded at the points where it touches the walls and the bottom of the pool, it tends to clean the pool. This separation of the filtered and unfiltered water is highly desirable for many reasons, among which is the reason that bacilli of many kinds propagate at a higher rate. By separating the pure water in this way, it cannot become polluted with bacilli from the other side. Of course I do not claim actually to prevent any possible bacilli pollution, but it is evident that it is advantageous to prevent as I do any mixture of the filtered and unfiltered water. After the sweep has moved to the far end of the pool, it can then be returned by hand when the water is to be again filtered, and it is preferable that it be returned at once so that there is a continuous circulation and filtration of the water.

It is evidently not essential that the pool have an inclined bottom not that the sweep move automatically from one end to the other of the pool.

It is understood that the embodiment of the invention described above and its special features are given only by way of example, and I do not wish to be limited in the practice of my invention nor in my claims to the particular embodiments or features disclosed above.

What I claim as new is:—

1. In an apparatus of the class described, a reservoir, means for purifying the liquid contained therein, means for returning the purified liquid to said reservoir, and means for preventing a mixture of the purified and unpurified liquid.

2. In an apparatus of the class described, in combination, a reservoir adapted to contain a large quantity of liquid, means for filtering said liquid connected with said reservoir, means for returning the filtered liquid to said reservoir, and means in said reservoir for substantially preventing a mixture of the filtered and unfiltered liquid.

3. In an apparatus of the class described, in combination, a reservoir adapted to contain a large quantity of liquid, means for filtering said liquid connected with said reservoir, means for returning the filtered liquid to said reservoir, and a movable sweep in said reservoir adapted to separate the filtered and unfiltered water.

4. In an apparatus of the class described, in combination, a reservoir adapted to contain a large quantity of liquid, means for filtering said liquid connected with said reservoir, means for returning the filtered liquid to said reservoir, a movable sweep in said reservoir adapted to separate the filtered and unfiltered water, and means for advancing said sweep along said reservoir as the filtered water enters.

5. In an apparatus of the class described in combination, a swimming pool having an exposed spill-way extending along the face of the wall thereof, in combination with a sweep disposed across said reservoir, means for withdrawing the water from said reservoir on one side of said sweep, means for filtering the water withdrawn, means for returning the filtered water to the reservoir on the other side of said sweep, and means for automatically advancing said sweep along said reservoir.

6. In an apparatus of the class described in combination, a swimming pool having an exposed spill-way extending along the face of the wall thereof, in combination with a sweep disposed across said reservoir, means for withdrawing the water from said reservoir on one side of said sweep, means for filtering the water withdrawn, means for returning the filtered water to the reservoir on the other side of said sweep, and means for automatically advancing said sweep along said reservoir, including means for causing a depression in the level of the water in the part of said reservoir toward which said sweep advances.

7. In an apparatus of the class described in combination, a swimming reservoir having an exposed spill-way extending along the face of the wall thereof, in combination with a sweep disposed across said reservoir, means for withdrawing the water from said reservoir on one side of said sweep, means for filtering the water withdrawn, means for returning the filtered water to the reservoir on the other side of said sweep, and means for automatically advancing said sweep along said reservoir, including an inclined support for said sweep, the depressed portion whereof is disposed toward the part of said reservoir toward which said sweep advances.

8. In an apparatus of the class described in combination, a swimming pool having a spill-way on the face of the wall thereof maintaining the level of the water in said pool, a sweep mounted transversely of said pool and adapted to move along said pool, an inclined support for said sweep having an elevated part near one end of said pool and a depressed part near the other end of said pool, said pool having means at the part thereof adjacent the depressed part of said support for causing a reduction in the water level on the adjacent side of said sweep, means for filtering the water, and means for returning the filtered water to the pool on the other side of said sweep.

Signed at South Bethlehem this 24 day of January 1914.

WILLIAM S. FRANKLIN.

Witnesses:
STANLEY S. SEYFERT,
C. DANIEL FRIEBELY.

Copies of this patent may be obtained for five cents each, by addressing the "Commissioner of Patents, Washington, D. C."